US012363076B2

(12) United States Patent
Huang et al.

(10) Patent No.: US 12,363,076 B2
(45) Date of Patent: Jul. 15, 2025

(54) NETWORK EXPOSURE FUNCTION (NEF) FOR SUCI-BASED UE-INITIATED SERVICE AUTHORIZATION

(71) Applicant: Verizon Patent and Licensing Inc., Basking Ridge, NJ (US)

(72) Inventors: Ye Huang, San Ramon, CA (US); Shanthala Kuravangi-Thammaiah, Keller, TX (US); Miguel A. Carames, Long Valley, NJ (US); Shiva Narayanabhatla, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 464 days.

(21) Appl. No.: 17/809,614

(22) Filed: Jun. 29, 2022

(65) Prior Publication Data
US 2024/0007444 A1    Jan. 4, 2024

(51) Int. Cl.
*H04L 9/40*    (2022.01)

(52) U.S. Cl.
CPC ...... *H04L 63/0414* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 11,184,356 B1* | 11/2021 | Tandon | H04L 67/141 |
| 12,021,904 B1* | 6/2024 | Corona | H04L 65/1045 |
| 12,177,662 B2* | 12/2024 | Torvinen | H04L 63/0428 |
| 2005/0210282 A1* | 9/2005 | Ohmori | G06F 21/445 |
| | | | 726/22 |
| 2006/0200467 A1* | 9/2006 | Ohmori | H04L 63/08 |
| | | | 707/999.009 |
| 2017/0093700 A1* | 3/2017 | Gilley | H04L 45/44 |
| 2018/0192289 A1* | 7/2018 | Dao | H04W 12/03 |
| 2019/0098502 A1* | 3/2019 | Torvinen | H04L 63/06 |
| 2019/0174449 A1* | 6/2019 | Shan | H04W 60/04 |
| 2020/0068397 A1* | 2/2020 | Kang | H04W 88/18 |
| 2020/0112907 A1* | 4/2020 | Dao | H04M 15/8016 |
| 2020/0204985 A1* | 6/2020 | An | H04W 4/60 |
| 2020/0275279 A1* | 8/2020 | Tangudu | H04W 12/06 |
| 2020/0374742 A1* | 11/2020 | Chong | H04W 72/542 |
| 2021/0092603 A1* | 3/2021 | Yang | H04W 12/069 |
| 2021/0105196 A1* | 4/2021 | Dao | H04L 43/026 |
| 2021/0112406 A1* | 4/2021 | Jiang | H04W 12/02 |
| 2021/0258861 A1* | 8/2021 | Wang | H04W 48/10 |
| 2021/0306855 A1* | 9/2021 | You | H04W 12/72 |

(Continued)

*Primary Examiner* — Khang Do

(57) ABSTRACT

A network device receives a network service request, for network service in a mobile network, from a user equipment device (UE), where the network service request includes a first service identifier (ID) and a subscription concealed ID (SUCI). The network device sends, to a Network Function (NF) in the mobile network, a SUCI deconcealment request that includes the SUCI. The network device receives, from the NF, a deconcealed Subscription Permanent Identifier (SUPI) decrypted from the SUCI. The network device verifies a validity of the first service ID for the deconcealed SUPI, and sends a service authorization response to the UE based on verification of the validity of the service ID from the UE.

17 Claims, 12 Drawing Sheets

(56) References Cited

U.S. PATENT DOCUMENTS

| | | | | |
|---|---|---|---|---|
| 2021/0334263 | A1* | 10/2021 | Roeland | G06F 16/2291 |
| 2021/0409214 | A1* | 12/2021 | Nix | H04L 9/085 |
| 2021/0409942 | A1* | 12/2021 | De Kievit | H04W 8/18 |
| 2022/0038896 | A1* | 2/2022 | Nair | H04L 9/3271 |
| 2022/0060325 | A1* | 2/2022 | Castellanos Zamora | H04W 8/20 |
| 2022/0264300 | A1* | 8/2022 | Nix | H04L 9/3265 |
| 2022/0300962 | A1* | 9/2022 | Zia | G06Q 20/326 |
| 2022/0417010 | A1* | 12/2022 | De Kievit | H04W 12/04 |
| 2023/0132934 | A1* | 5/2023 | Wilson | H04L 63/102 726/6 |
| 2023/0153411 | A1* | 5/2023 | Okuyama | G06F 21/6245 726/6 |
| 2023/0292109 | A1* | 9/2023 | Chuang | H04W 8/26 |
| 2023/0354013 | A1* | 11/2023 | Li | H04W 12/02 |
| 2024/0064847 | A1* | 2/2024 | Tiwari | H04W 76/20 |
| 2024/0114335 | A1* | 4/2024 | Baskaran | H04L 45/306 |
| 2024/0171402 | A1* | 5/2024 | Ramezan | H04L 9/3218 |
| 2024/0187968 | A1* | 6/2024 | Tiwari | H04W 8/20 |
| 2024/0224098 | A1* | 7/2024 | Sun | H04W 12/122 |
| 2024/0259803 | A1* | 8/2024 | De Kievit | H04W 8/18 |

* cited by examiner

NETWORK EXPOSURE FUNCTION (NEF) FOR SUCI-BASED UE-INITIATED SERVICE AUTHORIZATION

BACKGROUND

In mobile networks, network operators assign a unique identifier to each Subscriber Identity Module (SIM) card for each mobile device. This unique identifier may include an International Mobile Subscriber Identity (IMSI) (e.g., in Fourth Generation (4G) networks) or a Subscription Permanent Identifier (SUPI) (e.g., in Fifth Generation (5G) networks). In 4G networks, the mobile device may have to reveal its IMSI as plain-text during certain mobile network interactions, such as, for example, when the mobile device registers with the mobile network for the first time and has not yet been assigned a temporary identifier. A "man-in-the-middle" device, such as a "fake" base station, can intercept the plain-text IMSI transmitted between the mobile device and the mobile network (known as "IMSI catching") and use it to track the mobile device.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

In 5G mobile networks, the problem of IMSI catching has been addressed through the use of SUCIs that include ciphertext which identifies mobile devices. Instead of transmitting plaintext IMSIs to the mobile network, in 5G, mobile devices use an encryption scheme to encrypt at least a portion of a SUPI assigned to a mobile device's SIM card to generate a SUCI. The SUCI, including the SUPI in ciphertext, is transmitted from the mobile device to the mobile network when registering with the network, or performing other actions with the network that require identification of the mobile device. The mobile network, when authenticating the mobile device, for example, decrypts the ciphertext contained in the SUCI to obtain the mobile device's SUPI. The mobile network, to maintain the security of mobile subscriber identities, does not store the SUCI-to-SUPI association for any mobile subscriber.

To receive network service from a mobile network, a UE typically first sends a service request to a network element associated with the mobile network. The service request is usually authorized via a separate entitlement server, after which the UE initiates a second service request to the network service delivery element(s) of the mobile network. This service authorization process, thus, requires signaling traffic to both the mobile network and to an extra network element (e.g., the entitlement server), and interworking between the two. The service authorization process also requires provisioning overhead for maintaining authorization data and control across the entitlement server and the network service delivery elements. Further, the service authorization process incurs a higher latency due to signaling traffic needing to signal twice, once for the authorization request and a second time for the service call. Additionally, applications installed on UEs often use the UEs Mobile Directory Number (MDN) when requesting service authorization, resulting in possible interception of the MDN by, for example, a "man-in-the-middle" device that may misuse the MDN.

Exemplary embodiments described herein provide a Network Exposure Function (NEF) in the mobile network for maintaining UE service authorization data and for performing SUCI-based service authorization of UE service requests. Having the NEF, instead of two or more separate network elements, handle UE service request authorization reduces signaling traffic in the mobile network and also reduces latency associated with the service authorization process. Additionally, SUCI-based service authorization performed by the NEF prevents the unauthorized access and misuse of UE identifying information, such as MDNs, during the service authorization process.

Figure 1:
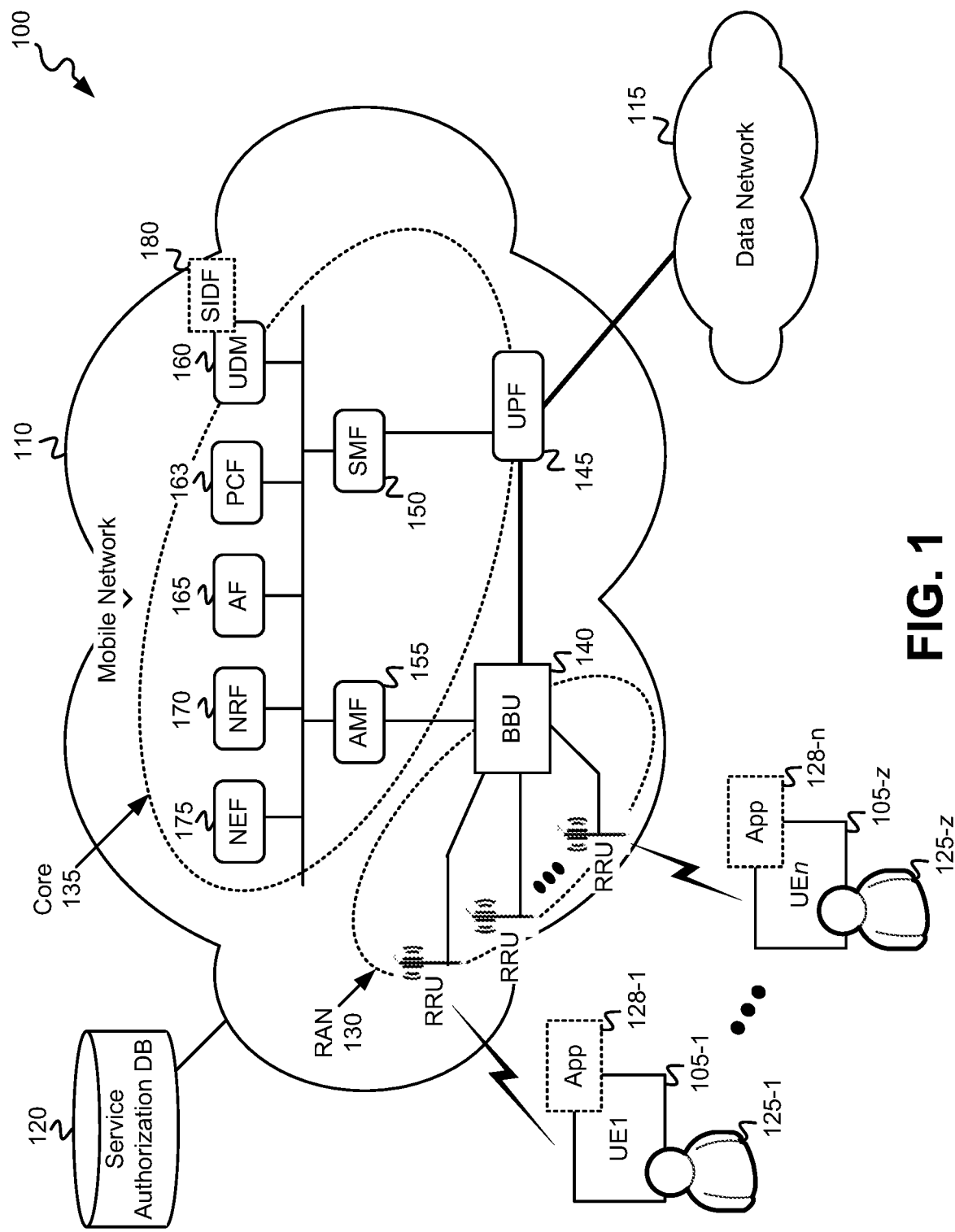
FIG. 1 depicts an exemplary network environment in which a Network Exposure Function (NEF) performs Subscription Concealed Identifier (SUCI)-based user equipment device (UE) service authorization.

FIG. 1 depicts an exemplary network environment 100 in which a NEF performs SUCI-based user equipment device (UE) service authorization. As shown, network environment 100 may include UEs 105-1 through 105-z (generically referred to herein as a "UE 105" or "UEs 105"), a mobile network 110, a data network(s) 115, and a service authorization database (DB) 120.

UEs 105 may each include any type of device having a communication capability such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 125-1 is shown in association with UE 105-1 and a user 125-z is shown in association with UE 105-z. A user 125 may alternatively be referred to herein as a "subscriber 125." One or more applications (apps) 128 may be installed at each UE 105 for performing a particular function, and/or for engaging in a particular network service with mobile network 110. In FIG. 1, an app 128-1 is shown installed at UE 105-1, and an app 128-n is shown installed at UE 105-n. Though only a single app 128 is shown installed at each UE 105, multiple different apps 128 may be installed at each UE 105.

Mobile network 110 may include a Public Land Mobile Network (PLMN) (referred to herein as a "mobile network 110" or a "network 110") and possibly one or more other networks (not shown). Mobile network 110 may be composed of sub-networks, such as a Radio Access Network (RAN) 130 and a core network 135. RAN 130 may include various types of radio access equipment that implement Radio Frequency (RF) communication with UEs 105. The radio access equipment of RAN 130 may include, for example, multiple Remote Radio Units (RRUs) and at least one baseband unit (BBU) 140. Though only a single BBU 140 is shown in FIG. 1, RAN 130 may include multiple BBUs. Each of the RRUs includes devices that operate as a radio function unit which transmit and receive RF signals to/from UEs 105. BBU 140 interconnects with the distributed RRUs of RAN 130 via fronthaul links or a fronthaul network. RAN 130 may additionally include other nodes, functions, and/or components not shown in FIG. 1. Though not shown in FIG. 1, in some implementations, BBU 140 may be functionally split into a centralized unit (CU) and one or more distributed units (DUs).

Core network 135 includes network devices that host and execute network functions (NFs) that operate the mobile network 110 including, among other NFs, mobile network access management, session management, and policy control NFs. In the exemplary network environment 100 of FIG. 1, core network 135 is shown as including a 5G mobile network that further includes 5G Network Functions (NFs), such as a User Plane Function (UPF) 145, a Session Management Function (SMF) 150, an Access and Mobility Management Function (AMF) 155, a Unified Data Management (UDM) function 160, a Policy Control Function (PCF) 163, an Application Function (AF) 165, a Network Repository Function (NRF) 170, and a NEF 175. UPF 145, SMF 150, AMF 155, UDM 160, PCF 163, AF 165, NRF 170, and NEF 175 may be implemented as virtual network functions (VNFs) within mobile network 110.

UPF 145 may act as a router and a gateway between mobile network 110 and data network 115, and forwards session data between data network 115 and RAN 130. Though only a single UPF 145 is shown in FIG. 1, mobile network 110 may include multiple UPFs 145 at various locations in network 110. SMF 150 performs session management, allocates network addresses to UEs 105, and selects and controls UPFs 140 for data transfer. AMF 155 performs authentication, authorization, and mobility management for UEs 105.

UDM 160 manages data for user access authorization, user registration, and data network profiles. UDM 160 may include, or operate in conjunction with, a User Data Repository (UDR—not shown) which stores user data, such as customer profile information, customer authentication information, user-subscribed network slice information, and encryption keys. UDM 160 may additionally host a Subscriber Identity Deconcealing Function (SIDF) 180 that decrypts ciphertext portions of SUCIs to reveal the plaintext of each subscriber's SUPI. SIDF 180 may receive SUCI deconcealment requests from, for example, NEF 175 and, in response, may decrypt the SUCI and return the decrypted plaintext SUPI to the NEF 175.

PCF 163 may provide policy rules for control plane functions (e.g., for network slicing, roaming, and/or mobility management) and may access user subscription information for policy decisions. AF 165 may provide session related information to PCF 163 in support of policy control rule generation, may access subscription information for policy decisions, and may provide application services to subscribers.

NRF 170 operates as a centralized repository of information regarding NFs in mobile network 110. NRF 170 enables NFs (e.g., UPF 145, SMF 150, AMF 155, UDM 160, AF 165, PCF 163, NEF 175) to register and discover each other via an Application Programming interface (API). NRF 170 maintains an updated repository of information about the NFs available in mobile network 110, along with information about the services provided by each of the NFs. NRF 170 further enables the NFs to obtain updated status information of other NFs in mobile network 110. NRF 170 may, for example, maintain profiles of available NF instances and their supported services, allow NF instances to discover other NF instances in mobile network 110, and allow NF instances to track the status of other NF instances.

NEF 175 may, as described herein, register newly installed applications at UEs 105 and store service identifiers (IDs) that are associated with the installed applications. For example, an Application_1 may be assigned a service ID_1 that identifies the service(s) provided by Application_1. NEF 175 may, as described further herein, receive service requests from UEs 105 and interact with UDM 160 to perform UE service request authorization. The service request authorization process may include SUPI verification, based on the UE 105s' SUCIs, and service ID verification.

Data network 115 may include one or more interconnected networks, such as local area networks (LANs), wide area networks (WANs), metropolitan area networks (MANs), and/or the Internet that are external to, and connected to, mobile network 110. Data network 115 may connect with UPF(s) 145 of mobile network 110. Data network 115 may include one or more network devices (e.g., a data center) that execute at least one application, and/or which provide server functions or network services.

Service authorization database (DB) 120 may store and maintain service authorization data, including a SUPI, a SUCI, a service ID(s), and a UE ID for each UE 105 that registers for service with mobile network 110.

The configuration of network components of the exemplary network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 135 may include other NFs not shown in FIG. 1. As a further example, though mobile network 110 is depicted in FIG. 1 as a 5G network having 5G network components/functions, mobile network 110 may alternatively include a 4G or 4.5G network with corresponding network components/functions, or a hybrid 5G/4G network that includes certain components of both a Next Generation network (e.g., a 5G network) and a 4G Long Term Evolution (LTE) network. Mobile network 110 may alternatively include another type of Next Generation network, other than the 5G network shown in FIG. 1. Additionally, though only a single instance of each of the NFs UPF 145, SMF 150, AMF 155, UDM 160, PCF 163, AF 165, NRF 170, and NEF 175 is shown in FIG. 1, mobile network 110 may include multiple instances of each of these NFs. For example, if mobile network 110 implements network slicing, then each of the configured network slices may include its own SMF 145, PCF 163, and UPF 140. Each of the NFs described above may be installed in, and be executed by, a network device residing in mobile network 110, or in another network (e.g., in an edge or a far edge network, not shown). A single network device may host and execute one or more of the NFs described above, and mobile network 110 may include at least one network device, or may have multiple (e.g., numerous) network devices.

Figure 2:
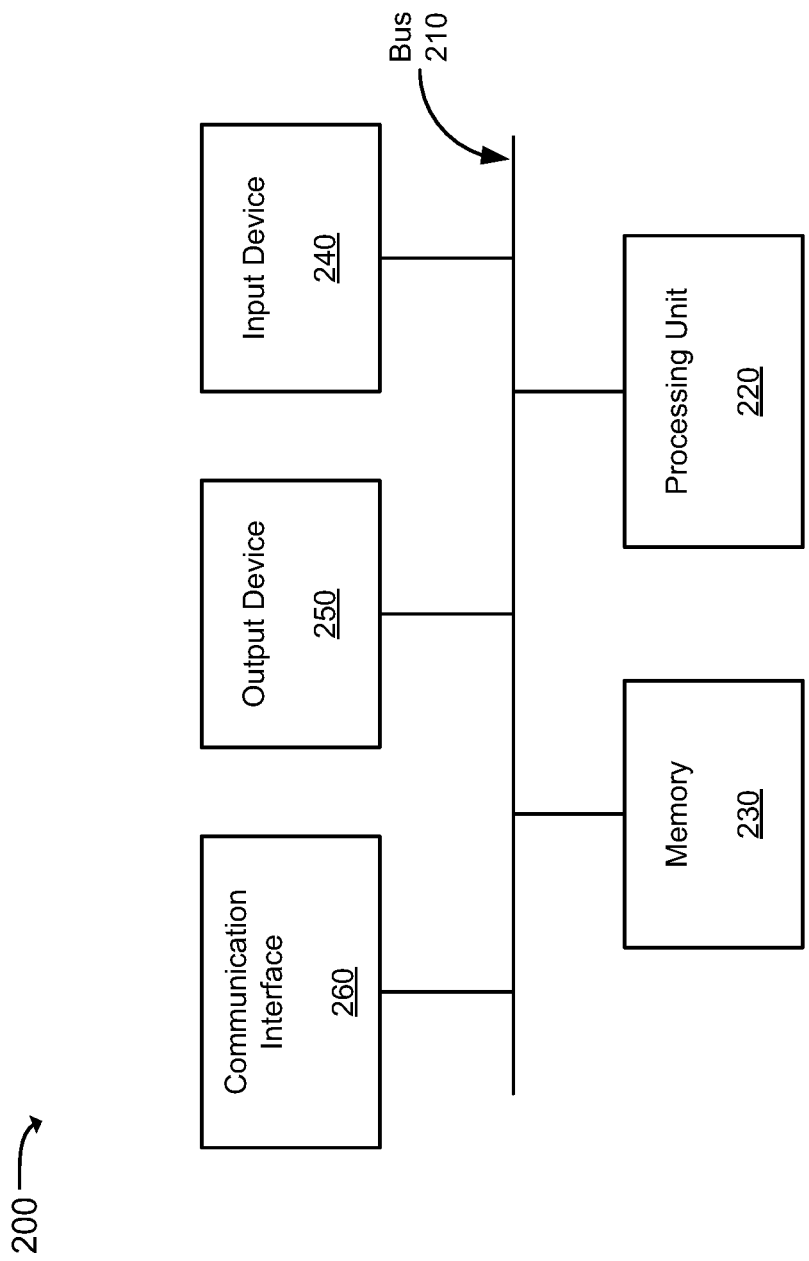
FIG. 2 is a diagram that depicts exemplary components of a network device as referred to herein.

FIG. 2 is a diagram that depicts exemplary components of a network device 200 (referred to herein as a "network device" or a "device"). UEs 105, the RRUs of RAN 130, and BBU 140 may each include components that are the same as, or similar to, those of device 200 shown in FIG. 2. Furthermore, each of the NFs UPF 145, SMF 150, AMF 155, UDM 160, PCF 163, AF 165, NRF 170, and NEF 175 may be implemented by a network device that includes components that are the same as, or similar to, those of device 200. Some of the NFs UPF 145, SMF 150, AMF 155, UDM 160, PCF 163, AF 165, NRF 170, and NEF 175 may be implemented by a same device 200 within mobile network 110, while others of the functions may be implemented by one or more separate devices 200 within mobile network 110.

Device 200 may include a bus 210, a processing unit 220, a memory 230, an input device 240, an output device 250, and a communication interface 260. Bus 210 may include a path that permits communication among the components of device 200. Processing unit 220 may include one or more processors or microprocessors which may interpret and execute instructions, or processing logic. Memory 230 may include one or more memory devices for storing data and instructions. Memory 230 may include a random access memory (RAM) or another type of dynamic storage device that may store information and instructions for execution by processing unit 220, a Read Only Memory (ROM) device or another type of static storage device that may store static information and instructions for use by processing unit 220, and/or a magnetic, optical, or flash memory recording and storage medium. The memory devices of memory 230 may each be referred to herein as a "tangible non-transitory computer-readable medium," "non-transitory computer-readable medium," or "non-transitory storage medium." In some implementations, the processes/methods set forth herein can be implemented as instructions that are stored in memory 230 for execution by processing unit 220.

Input device 240 may include one or more mechanisms that permit an operator to input information into device 200, such as, for example, a keypad or a keyboard, a display with a touch sensitive panel, voice recognition and/or biometric mechanisms, etc. Output device 250 may include one or more mechanisms that output information to the operator, including a display, a speaker, etc. Input device 240 and output device 250 may, in some implementations, be implemented as a user interface (UI) that displays UI information and which receives user input via the UI. Communication interface 260 may include a transceiver(s) that enables device 200 to communicate with other devices and/or systems. For example, communication interface 260 may include one or more wired and/or wireless transceivers for communicating via mobile network 110 and/or data network 115. In the case of RRUs of RAN 130, communication interface 260 may further include one or more antenna arrays for implementing radio frequency (RF) cell sectors.

The configuration of components of network device 200 illustrated in FIG. 2 is for illustrative purposes. Other configurations may be implemented. Therefore, network device 200 may include additional, fewer and/or different components, that may be arranged in a different configuration, than depicted in FIG. 2.

Figure 3:
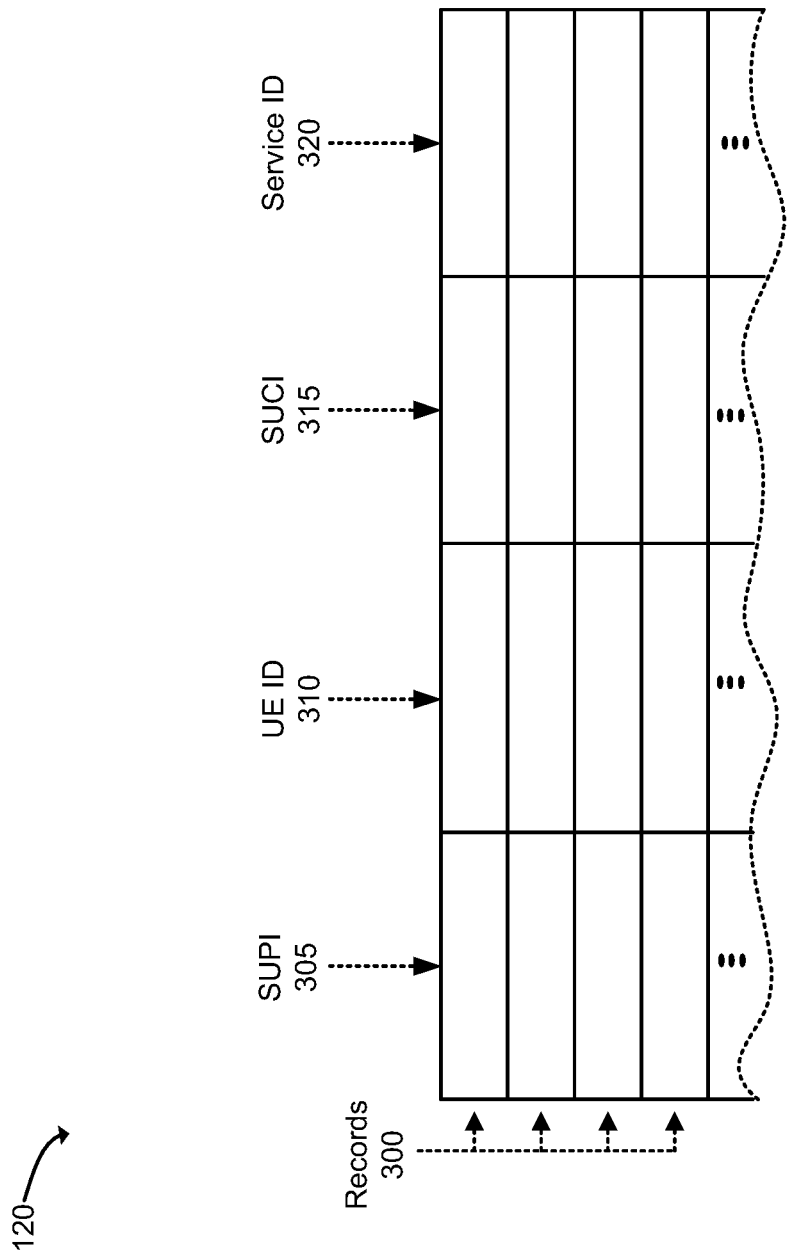
FIG. 3 depicts an exemplary data structure that may be stored in a service authorization database described herein.

FIG. 3 depicts an exemplary data structure that may be stored in service authorization DB 120. In some implementations, NEF 175 may store the data in DB 120, or may query and retrieve data from DB 120. The data structure of DB 120 may, as shown in the example of FIG. 3, include multiple records 300, with each record 300 including, for example, a SUPI field 305, a UE ID field 310, a SUCI field 315, and a service ID field 320.

SUPI field 305 stores data identifying a SUPI for a UE 105. UE ID field 310 stores data that identifies an ID for the UE also identified by the SUPI stored in the corresponding field 305 of record 300. The UE ID may include, for example, an MDN, an International Mobile Subscriber Identity (IMSI), or other type of globally unique ID for identifying a UE 105. SUCI field 315 stores data identifying a SUCI received from the UE 105 identified in fields 305 and 310 of the record 300. Service ID field 320 stores data associated with a service identifier that identifies a service associated with a particular application executing at the UE 105 identified in fields 305 or 310 of record 300, or associated with a particular function executed by the UE 105.

To locate a particular record 300, service authorization DB 120 may be queried with particular data to locate a record 300 having matching data stored in one of the fields 305, 310, 315 and/or 320. When such a record 300 is located, data may be stored in one or more fields of the record 300, or data may be retrieved from one or more fields of the record 300. For example, if a SUPI of a UE 105 is known, then the records 300 of DB 120 may be queried to locate a record 300 having a matching SUPI in field 305. Upon location of the record 300 with a matching SUPI in field 305, a service ID and/or SUCI may be retrieved from fields 320 or 315.

Service authorization DB 120 of FIG. 3 is depicted as including a tabular data structure with a certain number of fields having certain content. The tabular data structure shown in FIG. 3, however, is for illustrative purposes. Other types of data structures may alternatively be used. The number, types, and content of the entries and/or fields in the data structures illustrated in FIG. 3 are also for illustrative purposes. Other data structures having different numbers of, types of and/or content of, the entries and/or the fields may be implemented. Therefore, the data structure depicted in FIG. 3 may include additional, fewer and/or different entries and/or fields than those shown.

Figure 4:
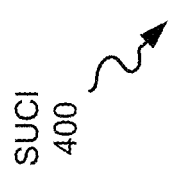
FIG. 4 illustrates an exemplary SUCI which includes a network subscriber's concealed Subscription Permanent Identifier (SUPI)

FIG. 4 illustrates an exemplary SUCI 400 which includes a network subscriber's concealed SUPI. A UE 105, when interacting with mobile network 110, may first encrypt its SUPI as ciphertext, using a public key that is part of a public key/private key pair provisioned by mobile network 110, and may insert the encrypted SUPI within SUCI 400. UE 105 may subsequently include SUCI 400 within various messages associated with interacting with mobile network 110 (e.g., registration requests, service requests, etc.). For example, UE 105 may send a message, as described below with respect to block 520 of FIG. 5, that includes a service ID and SUCI to UDM 160 for registering the service ID. As another example, UE 105 may send a service request message, as described below with respect to block 705 of FIG. 7A, that includes a SUCI and service ID, for requesting service from mobile network 110. SUCI 400 may contain a number of data fields, including a SUPI type field 405, a home network identifier (ID) field 410, a routing indicator field 415, a protection scheme field 420, a public key ID field 425, and a protection scheme output field 430.

SUPI type field 405 may store data that identifies a type of SUPI concealed in SUCI 400. The type of SUPI may be, for example, an IMSI or a Network Access Identifier (NAI). Home network ID 410 may store data that identifies the home network of the subscriber. When the SUPI type field 405 identifies an IMSI, then home network ID field 410 may identify a Mobile Country Code (MCC) and a Mobile Network Code (MNC) associated with the mobile network 110. When the SUPI type field 405 identifies a NAI, then home network ID field 410 may identify a string of characters with a variable length that represents a domain name (e.g., user@domain.com). Routing indicator field 415 stores routing data assigned by the home network operator and provisioned within the Universal Subscriber Identity Module (USIM) of the UE 105 associated with the SUPI concealed within the protection scheme output 430.

Protection scheme field 420 may store data that identifies the protection scheme used to encrypt the SUPI concealed as ciphertext within the protection scheme output 430. In some implementations, the protection scheme used may be an Elliptical Curve Integrated Encryption System (ECIES) protection scheme.

Public key ID field 425 stores data that identifies a particular public key, associated with the protection scheme identified in field 420, provisioned by mobile network 110 as part of a public/private key pair. The mobile network 110 may obtain a public/private key pair for a particular UE 105/mobile subscriber and provision the public key to the UE 105 and the private public key to UDM 160 for use by SIDF 180. Protection scheme output field 430 stores data that includes the SUPI, associated with the UE 105, that has been encrypted using the protection scheme identified by field 420 and the public key identified by field 425.

Figure 5:
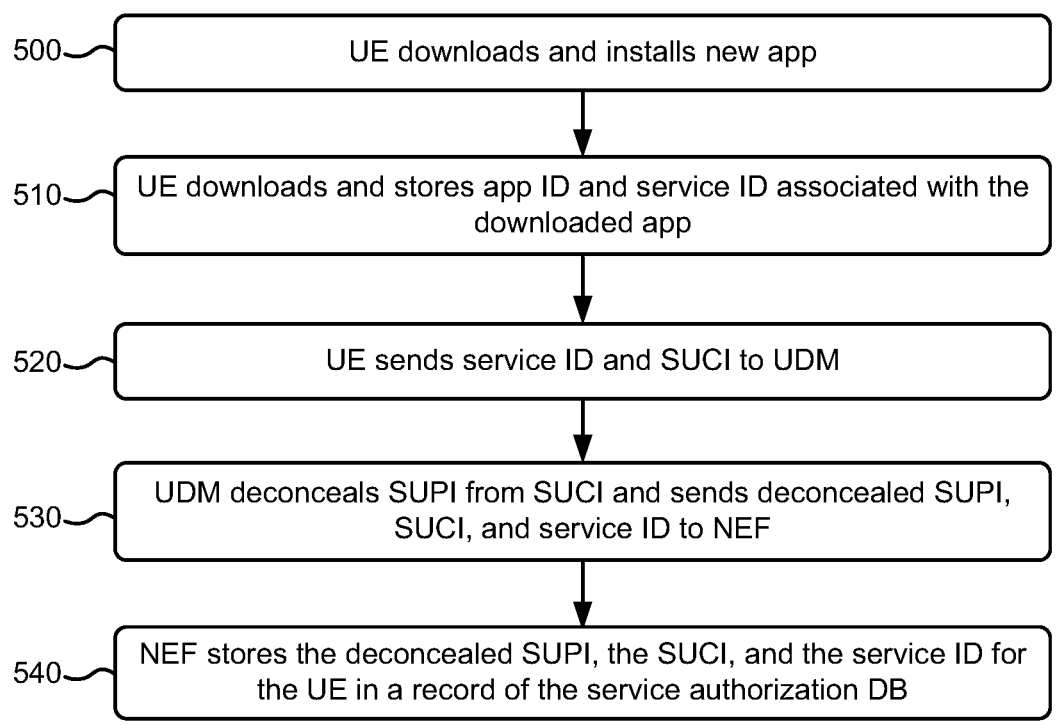
FIG. 5 is a flow diagram of an exemplary process for registering a service identifier associated with a UE and/or with an application at the UE.

FIG. 5 is a flow diagram of an exemplary process for registering a service ID associated with a UE 105 and/or with an application 128 at UE 105. In one implementation, the exemplary process of FIG. 5 may be implemented by a UE 105, UDM 160, and NEF 175. In other implementations, the exemplary process of FIG. 5 may be implemented by one or more additional, or other, network devices/NFs in mobile network 110. The exemplary process of FIG. 5 is described with additional reference to FIG. 6.

Figure 6:
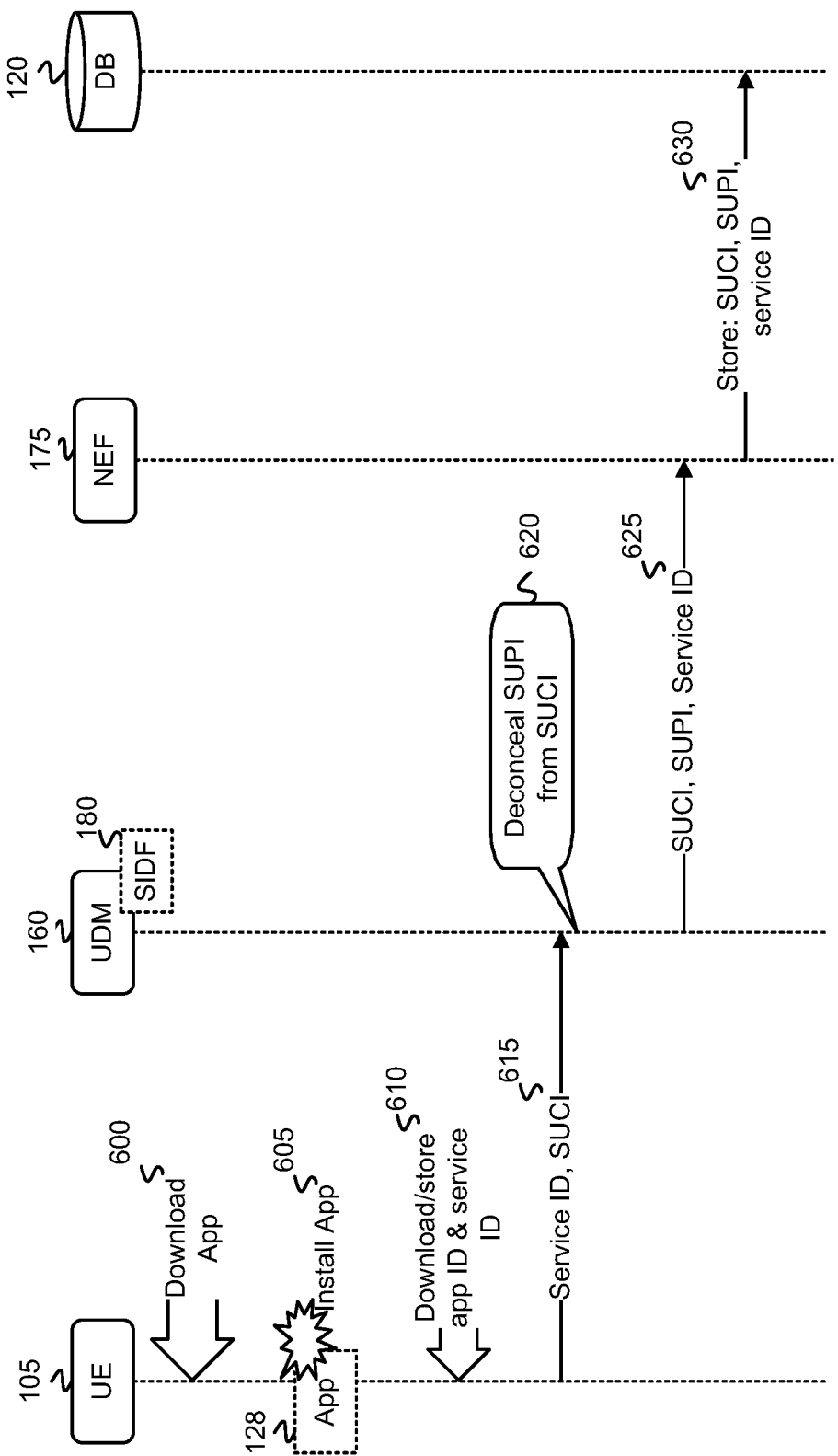
FIGS. 6, 8A, 8B, and 10 depict examples of operations, messages, and/or data flows associated with exemplary processes described herein.

The exemplary process includes a UE 105 downloading and installing a new application 128 (block 500), and additionally downloading and storing an application ID and a service ID associated with the downloaded application (block 510). UE 105 may download the new application from an application server that connects to mobile network 110 and/or to data network 115, and may subsequently install the downloaded app. UE 105 may further download, from the application server, the application ID for the downloaded application 128, and the service ID that is assigned to a service provided, or engaged in, by the application 128, and store the application ID and service ID in local memory (e.g., memory 230). FIG. 6 depicts UE 105 downloading 600 an app 128, installing 605 the application, and downloading 610 and locally storing the application ID and service ID associated with the downloaded app 128.

Referring back to FIG. 5, the UE 105 sends the service ID and the UE 105's SUCI to UDM 160 (block 520), and UDM 160, upon receipt of the service ID and SUCI from the UE 105, deconceals the UE 105's SUPI from the SUCI and sends the deconcealed SUPI, the SUCI and the service ID to NEF 175 (block 530). The UE 105 generates the SUCI by encrypting its SUPI, using a public key that is part of a public key/private key pair provisioned by mobile network 110, and inserts the encrypted SUPI within field 430 of the SUCI 400. Upon receipt of the SUCI from the UE 105, SIDF 180 of UDM 160 decrypts the SUCI to obtain the SUPI. SIDF 180 may obtain the public key ID from field 425 of SUCI 400, and determine the protection scheme used to encrypt the SUPI based on field 420. SIDF 180 retrieves the private key (from local or remote memory storage and previously provisioned by mobile network 110) that corresponds to the obtained public key ID, and then decrypts the ciphertext data contained in field 430 of SUCI 400 using the retrieved private key and a decryption algorithm that corresponds to the determined protection scheme. In an example in which the protection scheme identified in field 420 is ECIES, SIDF 180 uses the retrieved private key and applies an ECIES decryption algorithm to the ciphertext contained in field 430. The decryption algorithm applied to the ciphertext from field 430 results in retrieval of the plaintext SUPI. FIG. 6 illustrates UE 105 sending a message 615, that includes the service ID and UE 105's SUPI, to UDM 160. As further shown, UDM 160, upon receipt of message 615, deconceals 620 the SUPI from the received SUCI, and sends a message 625 to NEF 175 that includes the UE 105's SUCI, the deconcealed SUPI, and the service ID. NEF 175 stores the deconcealed SUPI, the SUCI, and the service ID for the UE 105 in a record of service authorization DB 120 (block 540). NEF 175 selects an empty record 300 in service authorization DB 120, and stores the deconcealed SUPI in field 305, the SUCI in field 315, and the service ID in field 320 of the selected record 300. As shown in the example of FIG. 6, upon receipt of message 625, NEF 175 stores 630 the received SUCI, deconcealed SUPI, and the service ID in service authorization DB 120 for subsequent queries, such as described below in the exemplary process of FIGS. 7A and 7B.

Figure 7A:
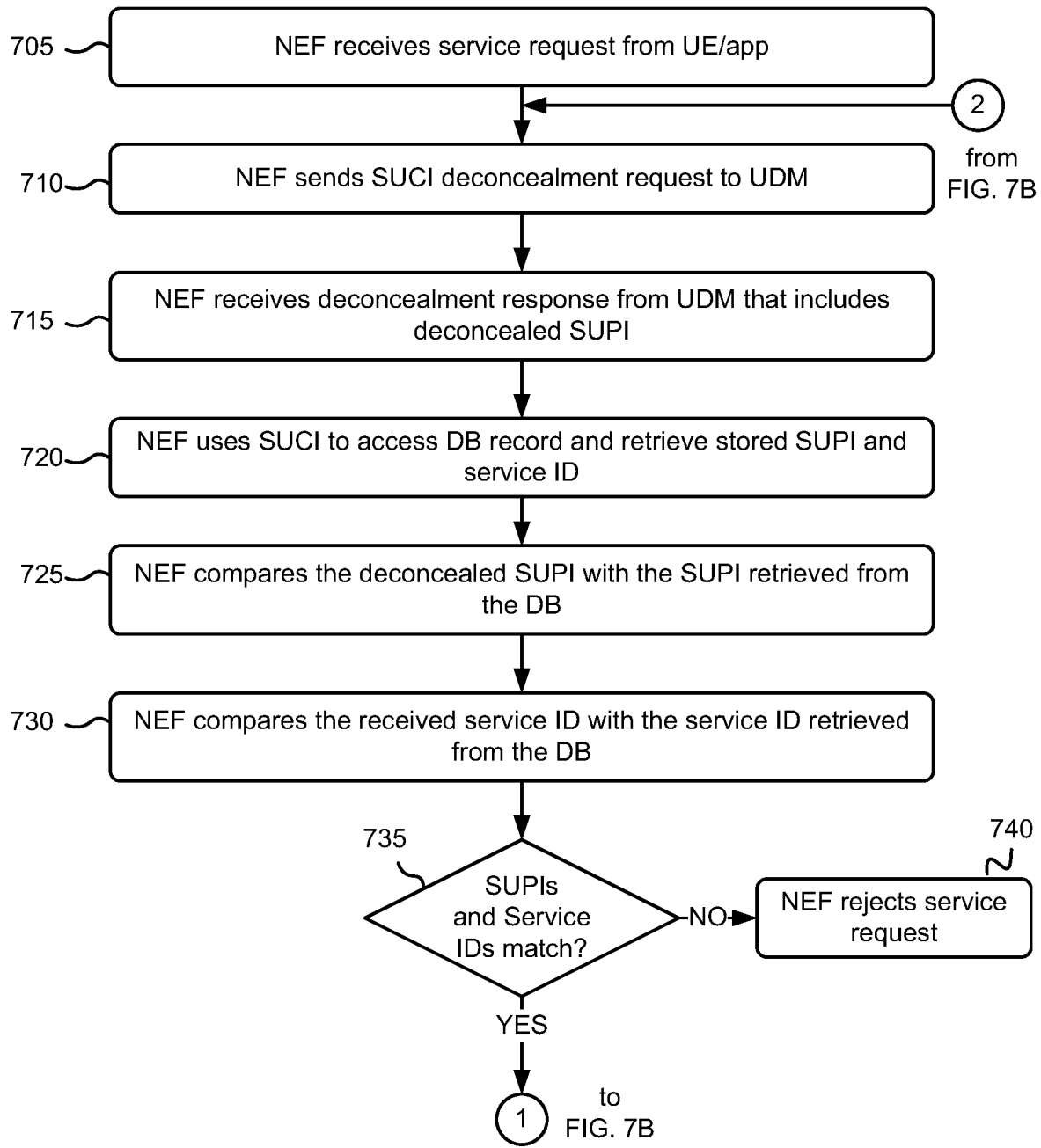
FIGS. 7A and 7B are flow diagrams of an exemplary process for SUCI-based UE service authorization.
Figure 7B:
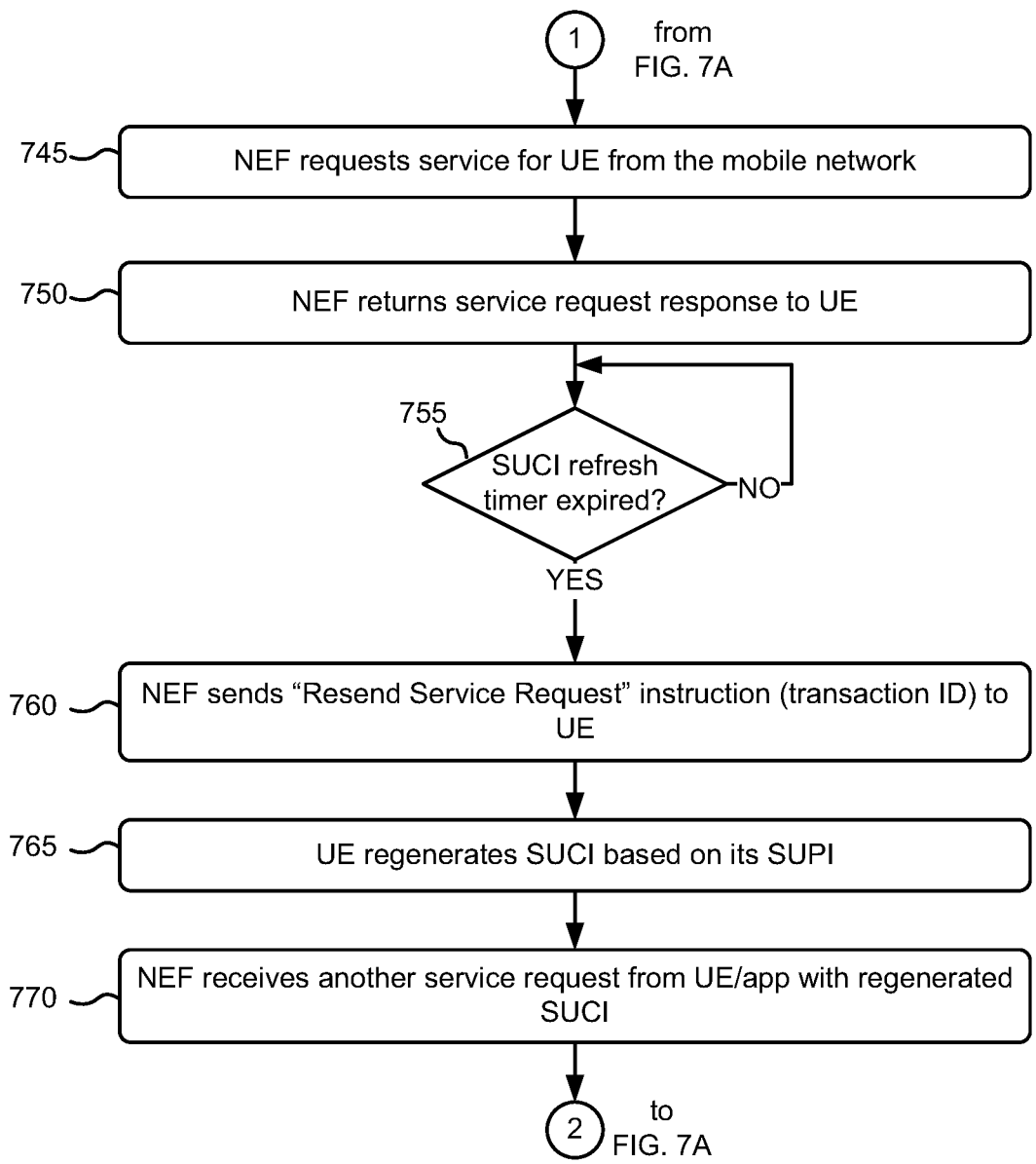

FIGS. 7A and 7B are flow diagrams of an exemplary process for SUCI-based UE service authorization. In one implementation, the exemplary process of FIGS. 7A and 7B may be implemented by NEF 175. In other implementations, the exemplary process of FIGS. 7A and 7B may be implemented by one or more other NFs/network devices in mobile network 110 in addition to, or instead of, NEF 175. The exemplary process of FIGS. 7A and 7B is described with additional reference to FIGS. 8A and 8B.

Figure 8A:
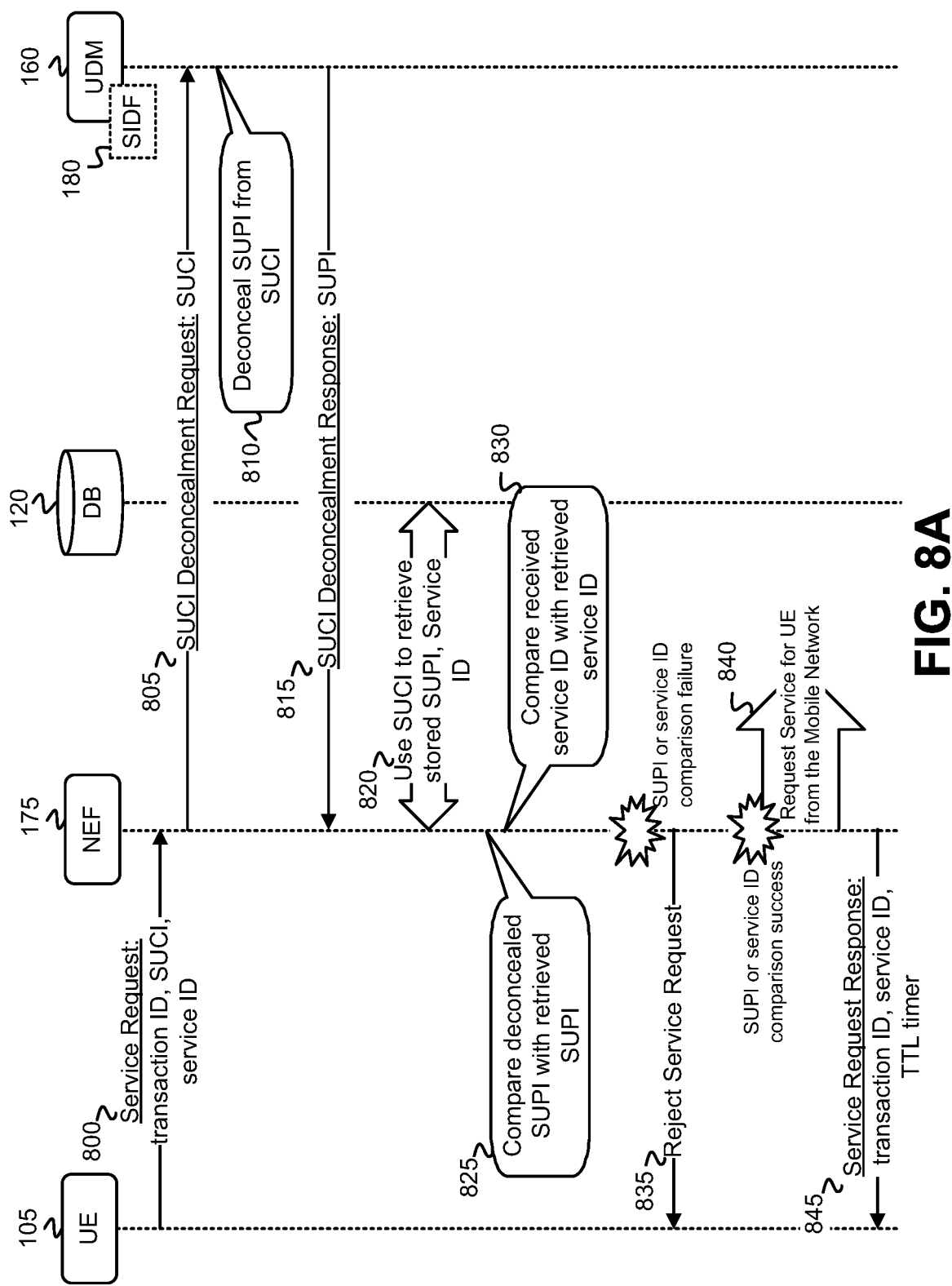

The exemplary process includes NEF 175 receiving a service request from a UE 105, and/or app 128 at a UE 105 (block 705). The service request may include a transaction ID, a SUCI for the UE 105, and a service ID. The transaction ID may identify a particular session or a particular service request. The UE 105 generates the SUCI by encrypting its SUPI, using a public private key that is part of a public key/private key pair provisioned by mobile network 110, and inserting the encrypted SUPI within field 430 of SUCI 400. FIG. 8A depicts NEF 175 receiving a service request 800 from UE 105 that includes a transaction ID, SUCI, and service ID.

Referring back to FIG. 7A, NEF 175 sends a SUCI deconcealment request to UDM 160 (block 710) and, in turn, receives a deconcealment response from UDM 160 that includes a deconcealed SUPI for the UE 105 (block 715). The SUCI deconcealment request sent by the NEF 175 includes the SUCI received from UE 105 in the service request of block 705. Upon receipt of the SUCI deconcealment request, SIDF 180 at UDM 160 decrypts the SUCI 400 to obtain the SUPI. To decrypt the SUCI 400, SIDF 180 obtains the public key ID from field 425 of the SUCI 400, and determines the protection scheme used to encrypt the SUPI based on field 420. SIDF 180 retrieves the private public key (from local or remote memory storage) that corresponds to the obtained public key ID, and then decrypts the ciphertext data contained in field 430 of SUCI 400 using the retrieved private key and a decryption algorithm that corresponds to the determined protection scheme. In an example in which the protection scheme identified in field 420 is ECIES, SIDF 180 uses the retrieved private key and applies an ECIES decryption algorithm to the ciphertext contained in field 430. The decryption algorithm applied to the ciphertext from field 430 results in retrieval of the plaintext SUPI. FIG. 8A illustrates SIDF 180 at UDM 160 deconcealing 810 the UE 105's SUPI from the received SUCI 400, and UDM 160 returning a SUCI deconcealment response 815 to NEF 175 that includes the deconcealed SUPI.

NEF 175 uses the SUCI to access a record in service authorization DB 120 and retrieve a stored SUPI and service ID (block 720). NEF 175 queries service authorization DB 120 to locate a record 300 having a SUCI value stored in field 315 that matches the SUCI received from the UE 105 in block 705. When a record 300 with matching SUCI is located, NEF 175 retrieves the SUPI from field 305 and the service ID from field 320 of the located record 300. FIG. 8A depicts NEF 175 using 820 the received SUCI to retrieve a SUPI and service ID stored in service authorization DB 120.

NEF 175 compares the deconcealed SUPI with the SUPI retrieved from DB 120 (block 725) and compares the received service ID with the service ID also retrieved from DB 120. If the deconcealed SUPI and retrieved SUPI do not match, or the received service ID and the retrieved service ID do not match (NO—block 735), then NEF 175 rejects the UE 105's service request (block 740). FIG. 8A shows NEF 175 comparing 825 the deconcealed SUPI with the SUPI retrieved from DB 120, and comparing 830 the received service ID with the service ID retrieved from DB 120. FIG. 8A further shows NEF 175 returning a service request rejection 835 to UE 105 in a case where the SUPI comparison indicates that the deconcealed SUPI and retrieved SUPI do not match, or where the service ID comparison indicates that the received service request and the retrieved service request do not match.

If the deconcealed SUPI and retrieved SUPI match one another, and the received service ID and the retrieved service ID also match one another (YES—block 735), then NEF 175 requests service for the UE 105 from the mobile network 110 (block 745)(FIG. 7B). NEF 175 may use known signaling for requesting and establishing network service between mobile network 110 and the UE 105. FIG. 8A depicts NEF 175, in a case where the SUPI comparison indicates that the deconcealed SUPI and retrieved SUPI match, and where the service ID comparison indicates that the received service request and the retrieved service request also match, requesting 840 service for the UE 105 from the mobile network 110 (not shown in FIG. 8A).

NEF 175 returns a service request response to the UE 105 (block 750). The service request response provides an indication that the requesting UE 105 has been authorized to receive network service, and may include the transaction ID, the service ID, and a time-to-live (TTL) timer value. The TTL timer value indicates a time period over which the requested service for the UE 105 is valid and after which the UE 105 or app 128 needs to send another service request. The TTL timer value may be a default TTL value that is a same value for all UEs 105, or the TTL timer value may vary, such as, for example, varying per UE 105, or varying depending upon a service class associated with the particular network service associated with the service ID. After obtaining the TTL timer value, the NEF 175 further obtains the transaction ID and service ID received from the UE 105 in block 705, and inserts the transaction ID, service ID, and TTL timer value in the outgoing service request response. FIG. 8A shows NEF 175 returning a Service Request Response message 845 to UE 105 that includes the transaction ID, the service ID, and the TTL timer value.

Figure 8B:
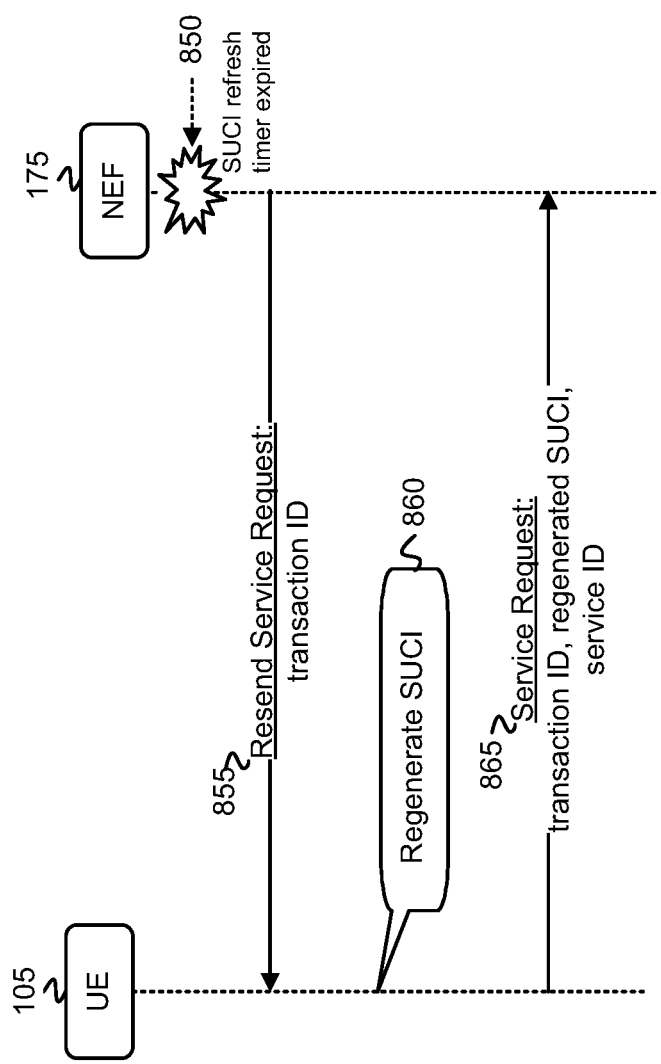

NEF 175 determines if a SUCI refresh timer has expired (block 755). NEF 175 may configure a SUCI refresh timer for each different UE 105 or for each different class of network service. Alternatively, NEF 175 may configure a default SUCI refresh timer value for use with all, or most, UEs 105. When, in block 750, NEF 175 returns a service request response to a UE 105 authorizing network service, NEF 175 activates the SUCI refresh timer and allows the refresh timer to count down to expiration at zero. For example, the SUCI refresh timer for a UE 105 may be five minutes, and the timer expires when the five minutes has passed subsequent to NEF 175 returning the service request response to the UE 105. If the SUCI refresh timer has expired (YES—block 755), then NEF 175 sends a "Resend Service Request" instruction to the UE 105 (block 760). FIG. 8B depicts NEF 175 determining that the SUCI refresh timer has expired 850, and NEF 175 then challenging UE 105 with a "Resend Service Request" message 855 that includes the transaction ID originally received by NEF 175 from UE 105.

NEF 175 receives another service request from the UE 105, or its app 128, with a regenerated SUCI (block 765). Upon receipt of the "Resend Service Request" from NEF 175, the UE 105 regenerates the SUCI by again encrypting its SUPI, using the public key that is part of the public key/private key pair provisioned by mobile network 110, and inserts the encrypted SUPI within field 430 of the SUCI 400. UE 105 then sends another service request to the NEF 175 with the regenerated SUCI, the transaction ID, and the service ID. FIG. 8B shows UE 105 regenerating 860 the SUCI, and then sending a Service Request message 865 to NEF 175 that includes the transaction ID, the regenerated SUCI, and the service ID. The exemplary process may subsequently return to block 710, with NEF 175 performing blocks 710-750 to authorize or deny service to the UE 105 based on the regenerated SUCI and the service ID.

Figure 9:
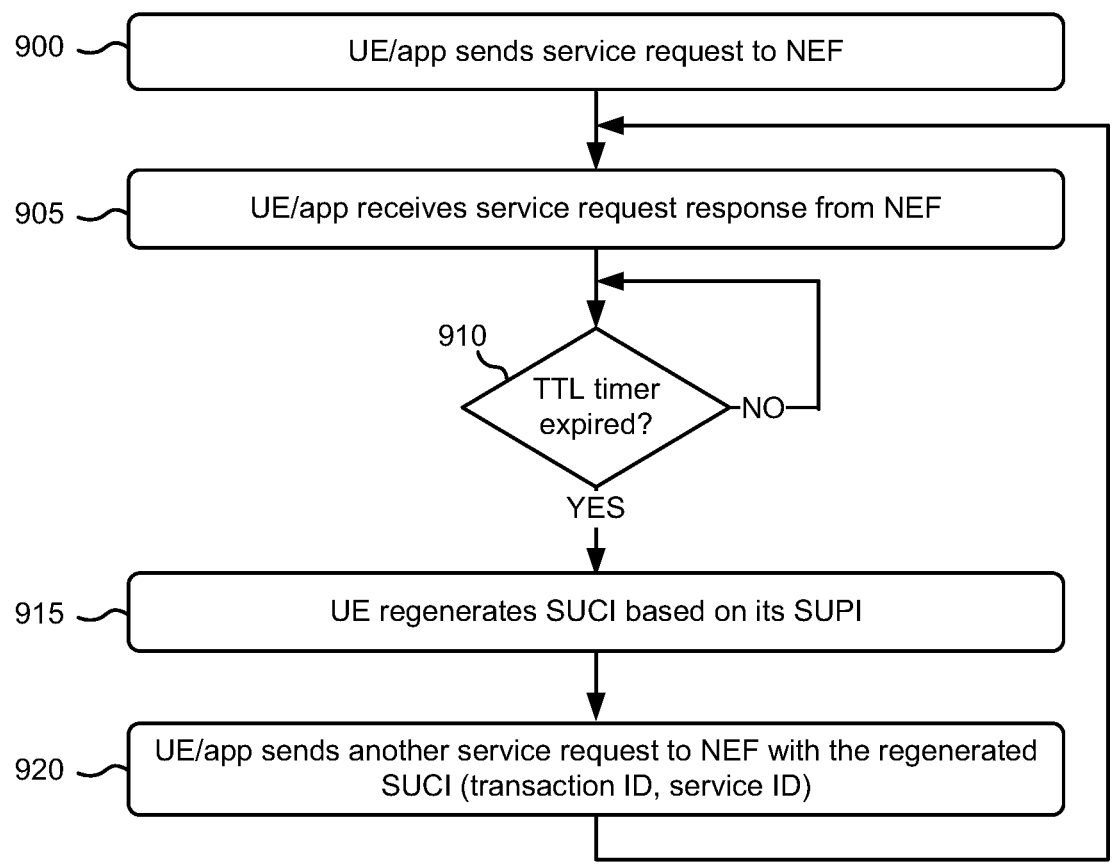
FIG. 9 is a flow diagram of an exemplary process for a UE to resend a service request to a NEF based on a time-to-live timer value received in a first service request response from the NEF.

FIG. 9 is a flow diagram of an exemplary process for a UE 105 to resend a service request to NEF 175 based on a TTL timer value received in a first service request response from NEF 175. The exemplary process of FIG. 9 may be implemented by a UE 105, or an app 128 at a UE 105. The exemplary process of FIG. 9 is described with additional reference to FIG. 10.

Figure 10:
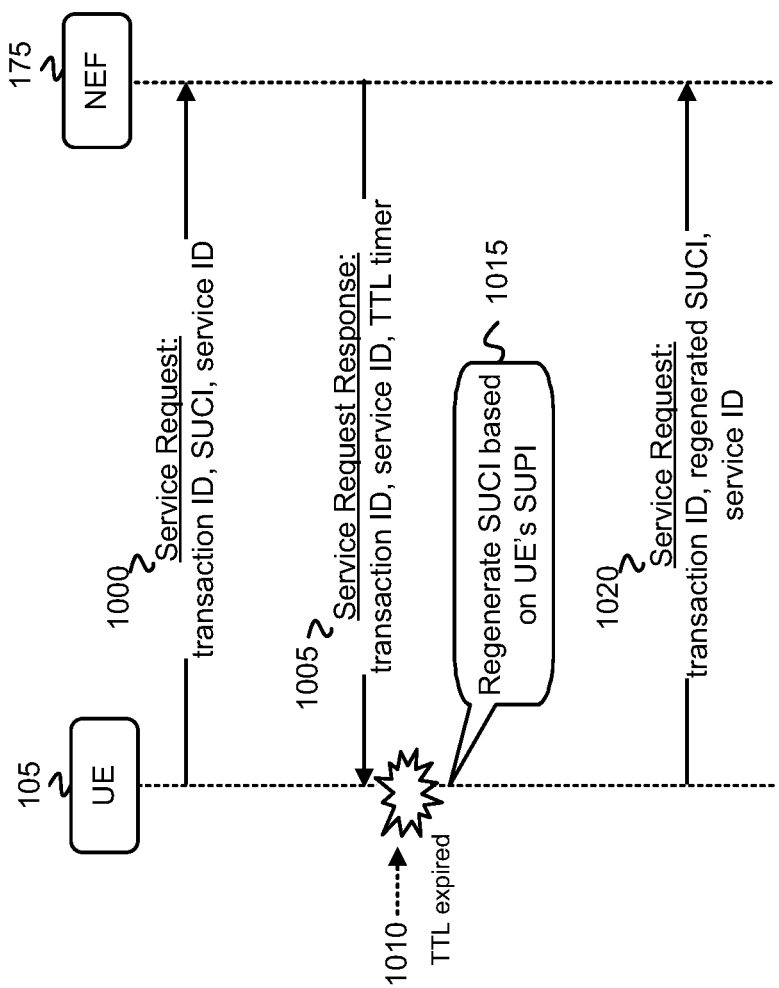

The exemplary process includes UE 105, or app 128 at UE 105, sending a service request to NEF 175 (block 900). As described above with respect to block 705, the service request may include a transaction ID, a SUCI for the UE 105, and a service ID. The transaction ID may identify a particular session or a particular service request. The UE 105 generates the
SUCI by encrypting its SUPI, using a public key that is part of a public key/private key pair provisioned by mobile network 110, and inserting the encrypted SUPI within field 430 of SUCI 400. FIG. 10 shows UE 105 sending a service request message 1000 to NEF 175 that includes a transaction ID for the service request, a SUCI for the UE 105, and a service ID.

UE 105, or app 128 at UE 105, receives a service request response from NEF 175 (block 905). The service request response may include a transaction ID, a service ID, and a TTL timer value. As described above with respect to block 750, the TTL timer value indicates a time period over which the requested service for the UE 105 is valid and after which the UE 105 or app 128 needs to send another service request. As also previously described, the TTL timer value may be a default TTL value that is a same value for all UEs 105, or the TTL timer value may vary, such as, for example, varying per UE 105, or varying depending upon a service class associated with the particular network service associated with the service ID. FIG. 10 depicts UE 105 receiving a Service Request Response message 1005 from NEF 175 that includes the transaction ID, the service ID, and the TTL timer value.

UE 105 determines if the TTL timer has expired (block 910) and, when the TTL timer has expired (YES-block 910), then UE 105 regenerates a SUCI based on its SUPI (block 915), and UE 105, or app 128 at UE 105, sends another service request to NEF 175 with the regenerated SUCI (block 920). The UE 105 regenerates the SUCI by again obtaining its SUPI, encrypts the SUPI using a public key that is part of a public key/private key pair provisioned by mobile network 110, and inserts the encrypted SUPI within field 430 of SUCI 400 before re-sending the SUCI 400 to NEF 175 in another service request. FIG. 10 shows UE 105 determining that the TTL timer has expired 1010 and UE 105 consequently regenerating 1015 its SUCI based on the UE 105's SUPI. As further shown in FIG. 10, UE 105 re-sends another service request message 1020 that includes the transaction ID, the regenerated SUCI, and the service ID.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7A, 7B, and 9, and sequences of operations, messages, and/or data flows with respect to FIGS. 6, 8A, 8B, and 10, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 220) of a device. A non-transitory storage medium includes one or more of the storage mediums described in relation to memory 230. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise. The word "exemplary" is used herein to mean "serving as an example." Any embodiment or implementation described as "exemplary" is not necessarily to be construed as preferred or advantageous over other embodiments or implementations.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a Network Exposure Function (NEF) from a Unified Data Management (UDM) function in a mobile network, registration data associated with an application installed at a User Equipment device (UE), wherein the registration data comprises a first subscription concealed ID (SUCI), a first Subscription Permanent Identifier (SUPI) deconcealed from the first SUCI, and a first service identifier (ID) associated with the application;
   receiving, at the NEF, a network service request from the UE, wherein the network service request includes a second service ID and a second SUCI;
   obtaining, by the NEF from the UDM function, a second SUPI deconcealed from the second SUCI by the UDM function;
   comparing, by the NEF, the second service ID with the first service ID;
   comparing, by the NEF, the deconcealed second SUPI with the first SUPI; and sending, by the NEF, a service authorization response to the UE based on the comparison of the deconcealed second SUPI with the first SUPI and the comparison of the second service ID with the first service ID.

2. The method of claim 1, wherein the service authorization response includes a time-to-live timer value that indicates when the UE is to regenerate the second SUCI and send another network service request.

3. The method of claim 1, further comprising:
determining, by the NEF, whether a SUCI refresh timer has expired for the network service request; and
sending, if the SUCI refresh timer has expired, a challenge to the UE to have the UE regenerate the second SUCI and submit another network service request for reauthorization.

4. The method of claim 1, further comprising:
requesting, by the NEF based on the comparison of the deconcealed second SUPI with the first SUPI, network service from the mobile network for the UE.

5. The method of claim 1, wherein obtaining the second SUPI further comprises:
sending, from the NEF to the UDM function, a SUCI deconcealment request that includes the second SUCI; and
receiving, by the NEF from the UDM function, the deconcealed second SUPI decrypted from the second SUCI.

6. The method of claim 1, wherein comparing the deconcealed second SUPI with the first SUPI comprises:
determining whether the deconcealed second SUPI matches the first SUPI,
wherein sending the service authorization response to the UE occurs if the deconcealed second SUPI matches the first SUPI.

7. A network device, comprising:
at least one communication interface configured to communicate via a mobile network to receive, from a Unified Data Management (UDM) function in the mobile network, registration data associated with an application installed at a User Equipment device (UE), wherein the registration data comprises a first subscription concealed ID (SUCI), a first Subscription Permanent Identifier (SUPI) deconcealed from the first SUCI, and a first service identifier (ID) associated with the application; and
at least one processor configured to execute a Network Exposure Function (NEF) to:
receive, via the at least one communication interface, a network service request from the UE, wherein the network service request includes a second service ID and a second SUCI;
obtain, via the at least one communication interface from the UDM function, a second SUPI deconcealed from the second SUCI by the UDM function;
compare the second service ID with the first service ID;
compare the deconcealed second SUPI with the first SUPI; and
send, via the at least one communication interface, a service authorization response to the UE based on the comparison of the deconcealed second SUPI with the first SUPI and the comparison of the second service ID with the first service ID.

8. The network device of claim 7, wherein the service authorization response includes a time-to-live timer value that indicates when the UE is to regenerate the second SUCI and send another network service request.

9. The network device of claim 7, wherein the at least one processor is further configured to execute the NEF to:
determine whether if a SUCI refresh timer has expired for the network service request; and
send, via the at least one communication interface if the SUCI refresh timer has expired, a challenge to the UE to have the UE regenerate the second SUCI and submit another network service request for reauthorization.

10. The network device of claim 7, wherein the at least one processor is further configured to execute the NEF to:
request, via the at least one communication interface based on the comparison of the deconcealed second SUPI with the first SUPI, network service from the mobile network for the UE.

11. The network device of claim 7, wherein, when obtaining the second SUPI, the at least one processor is further configured to execute the NEF to:
send, via the at least one communication interface to the UDM function, a SUCI deconcealment request that includes the second SUCI; and
receive, via the at least one communication interface from the UDM function, the deconcealed second SUPI decrypted from the second SUCI.

12. The network device of claim 7, wherein, when comparing the deconcealed second SUPI with the first SUPI, the at least one processor is further configured to execute the NEF to:
determine whether the deconcealed second SUPI matches the first SUPI,
wherein sending the service authorization response to the UE occurs if the deconcealed second SUPI matches the first SUPI.

13. A non-transitory storage medium storing instructions executable by a Network Exposure Function (NEF) in a network device, wherein the instructions cause the NEF to:
receive, from a Unified Data Management (UDM) function in a mobile network, registration data associated with an application installed at a User Equipment device (UE), wherein the registration data comprises a first subscription concealed ID (SUCI), a first Subscription Permanent Identifier (SUPI) deconcealed from the first SUCI, and a first service identifier (ID) associated with the application;
receive a network service request, from the UE, wherein the network service request includes a second service ID and a second SUCI;
obtain, from the UDM function, a second SUPI deconcealed from the second SUCI by the UDM function;
compare the second service ID with the first service ID;
compare the deconcealed second SUPI with the first SUPI; and
send a service authorization response to the UE based on the comparison of the deconcealed second SUPI with the first SUPI and the comparison of the second service ID with the first service ID.

14. The non-transitory storage medium of claim 13, wherein the service authorization response includes a time-to-live timer value that indicates when the UE is to regenerate the second SUCI and send another network service request.

15. The non-transitory storage medium of claim 13, wherein the instructions further cause the NEF to:
determine whether if a SUCI refresh timer has expired for the network service request; and send, if the SUCI refresh timer has expired, a challenge to the UE to have the UE regenerate the second SUCI and submit another network service request for reauthorization.

16. The non-transitory storage medium of claim 13, wherein the instructions to cause the NEF to obtain the second SUPI further comprise instructions to cause the NEF to:

send, to the UDM function, a SUCI deconcealment request that includes the second SUCI; and receive, from the UDM function, the deconcealed second SUPI decrypted from the second SUCI.

17. The non-transitory storage medium of claim 13, wherein the instructions to cause the NEF to compare the deconcealed second SUPI with the first SUPI further comprise instructions to cause the NEF to:

determine whether the deconcealed second SUPI matches the first SUPI, wherein sending the service authorization response to the UE occurs if the deconcealed second SUPI matches the first SUPI.

* * * * *